US012065950B1

(12) United States Patent
Lefebvre et al.

(10) Patent No.: US 12,065,950 B1
(45) Date of Patent: Aug. 20, 2024

(54) STRUCTURAL SCROLL CASE

(71) Applicant: PRATT & WHITNEY CANADA CORP., Longueuil (CA)

(72) Inventors: Guy Lefebvre, St-Bruno-de-Montarville (CA); Christopher Gover, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/296,491

(22) Filed: Apr. 6, 2023

(51) Int. Cl.
*F01D 9/02* (2006.01)
*F01D 21/04* (2006.01)
*F01D 25/24* (2006.01)

(52) U.S. Cl.
CPC ........... *F01D 9/026* (2013.01); *F01D 21/045* (2013.01); *F01D 25/243* (2013.01); *F05D 2220/323* (2013.01); *F05D 2240/14* (2013.01); *F05D 2260/31* (2013.01)

(58) Field of Classification Search
CPC .. F01D 9/026; F01D 25/243; F05D 2220/323; F05D 2240/14; F05D 2260/31
See application file for complete search history.

(56) References Cited

U.S. PATENT DOCUMENTS 2,421,833 A 6/1947 Cronstedt et al.
3,738,105 A 6/1973 Buchelt
7,093,448 B2 8/2006 Nguyen et al.
7,931,437 B1 4/2011 Johnson
9,970,295 B2 5/2018 Fontaine et al.
11,187,149 B2 11/2021 Kobielski et al.
2011/0008162 A1* 1/2011 Yokoyama .............. F01D 9/026 415/204
2013/0064655 A1* 3/2013 Smatloch .................. F02C 6/12 415/182.1
2013/0156567 A1* 6/2013 Nagae ...................... F01D 9/026 415/205
2017/0204743 A1* 7/2017 Yokoyama .............. F01D 9/026
2017/0218760 A1* 8/2017 Fontaine ............... F01C 11/008
2018/0216494 A1* 8/2018 Azuma .................... F01D 25/26
2019/0316516 A1* 10/2019 Arai ......................... F01D 9/026
2020/0182257 A1* 6/2020 Uemura ................ F04D 29/403
2020/0200073 A1* 6/2020 Uemura ................ F01D 25/145

FOREIGN PATENT DOCUMENTS

JP 2002349276 A * 12/2002 ............. F01D 9/026

OTHER PUBLICATIONS

JP-2002349276-A, (Horikawa; Dec. 2002). English Translation. (Year: 2023).*

* cited by examiner

*Primary Examiner* — J. Todd Newton
*Assistant Examiner* — Aye S Htay
(74) *Attorney, Agent, or Firm* — NORTON ROSE FULBRIGHT CANADA LLP

(57) ABSTRACT

A scroll case is configured as a structural component to carry structural loads from other engine components, such as an internal containment ring, an exhaust casing and an engine tailpipe.

20 Claims, 3 Drawing Sheets

STRUCTURAL SCROLL CASE

TECHNICAL FIELD

The disclosure relates generally to turbomachinery and, more particularly, to a scroll case for such engines.

BACKGROUND OF THE ART

In some engine architectures, aerodynamic flow distributors, such as scroll or volute structures, are used to receive combustion gases and to regulate them in a suitable manner before the combustion gases meet stator vanes or rotor blades of the downstream turbine section(s). Typically, due to their configurations, such aerodynamic distributors are limited to their aerodynamic role.

SUMMARY

In one aspect, there is provided an aircraft engine comprising: a turbine including a rotor rotatable about a central axis; a scroll case including an inlet fluidly connected to a source of combustion gases and an outlet fluidly connected to the turbine, a conduit extending around the central axis from the inlet to the outlet, the conduit having a non-axisymmetric portion extending downstream from the inlet and spiraling towards the central axis, and an axisymmetric portion extending downstream from the non-axisymmetric portion to the outlet, a front flange structurally connected to a front wall of the conduit at a first radial location on the axisymmetric portion of the conduit, the first radial location being radially inward of the non-axisymmetric portion; and a rear flange structurally connected to a rear wall of the conduit at a second radial location on the axisymmetric portion of the conduit, the second radial location being radially inward of the non-axisymmetric portion; and an exhaust case disposed downstream of the turbine, the exhaust case structurally supported by the scroll case, the exhaust case attached to the rear flange of the scroll case.

In another aspect, there is provided a turbine assembly comprising a turbine having a turbine rotor rotatable about a central axis; a scroll case for channeling a flow of combustion gases to the turbine; the scroll case including: a conduit winding about the central axis between an inlet and an outlet, the conduit having a non-axisymmetric portion extending from the inlet and an axisymmetric portion extending downstream from the non-axisymmetric portion to the outlet, the axisymmetric portion having an outer cylindrical boundary radially spaced from the central axis by a radius RT; a front flange structurally connected to a front wall of the conduit at a first radial distance R1 from the central axis; and a rear flange structurally connected to a rear wall of the conduit at a second radial distance R2 from the central axis; and wherein R1 and R2≤RT.

In a further aspect, there is provided a scroll case for interconnecting a thermal engine to an axial turbine, comprising: a structural mono-case body including: a conduit extending circumferentially about a central axis between an inlet and an outlet, the outlet extending circumferentially about the central axis and oriented axially relative to the central axis, the conduit having a non-axisymmetric portion spiraling from the inlet toward the central axis, an axisymmetric portion extending around the central axis from the non-axisymmetric portion to the outlet; a front flange connected to a front wall of the axisymmetric portion of the conduit via a hairpin connection at a location radially inward of the non-axisymmetric portion; a cylinder projecting axially from a rear wall of the conduit, the cylinder disposed radially inward of the non-axisymmetric portion of the conduit; and a rear flange extending radially outwardly from the cylinder.

DESCRIPTION OF THE DRAWINGS

Reference is now made to the accompanying figures in which.

DETAILED DESCRIPTION

Figure 1:
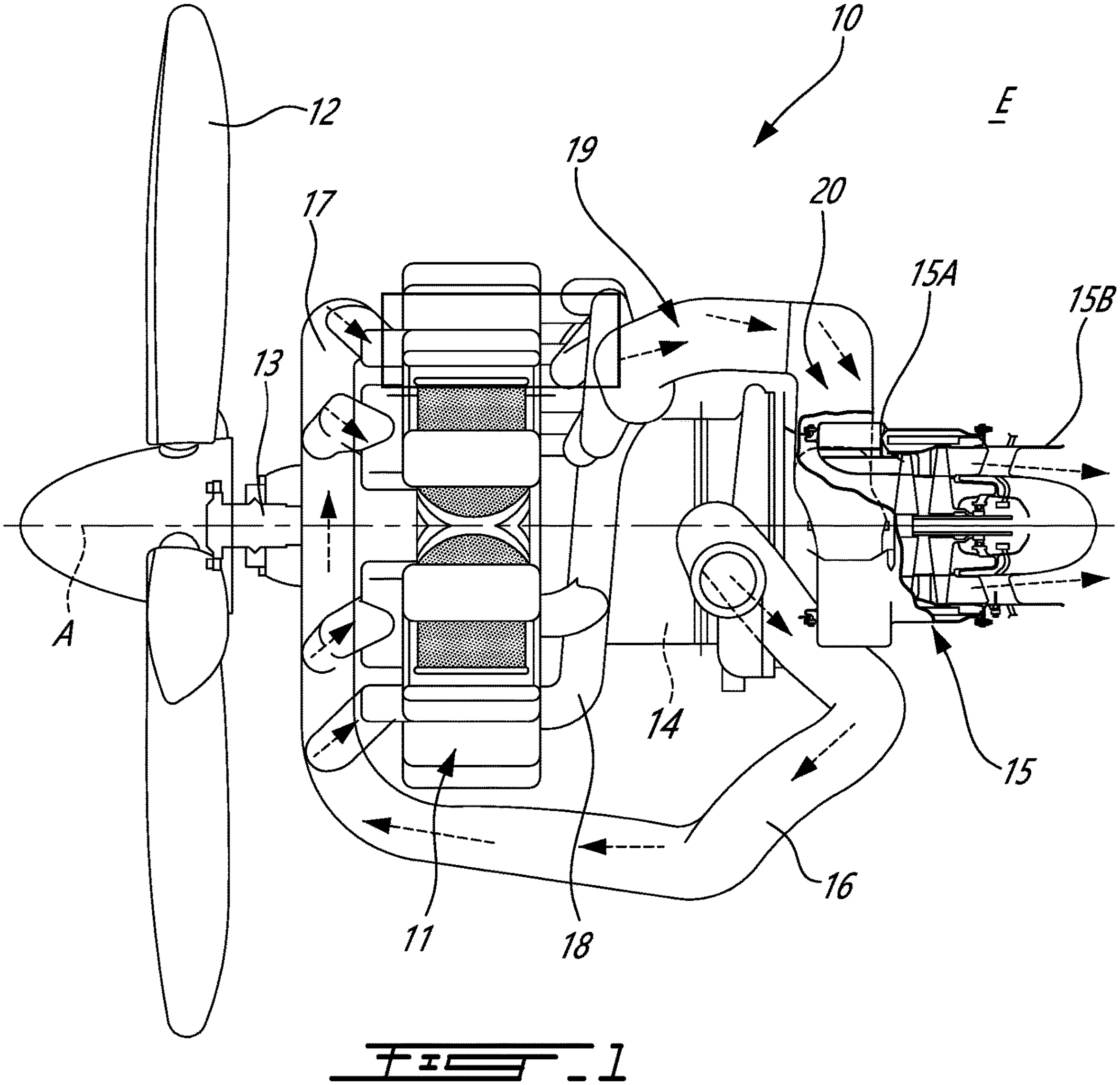
FIG. 1 is a schematic side view of an aircraft engine in accordance with one embodiment.

Referring to FIG. 1, an aircraft engine 10 is schematically shown. The engine 10 comprises a thermal engine module 11 including one or more internal combustion engine(s), drivingly engaged to a rotatable load 12, herein depicted as a propeller, via an output shaft 13. The output shaft 13 may correspond to an engine shaft of the thermal engine module 11. The thermal engine module 11 may include any engine having at least one combustion chamber of varying volume. For instance, the thermal engine module 11 may comprise one or more piston engine(s) or one or more rotary engine(s) (e.g., Wankel engines). The engine 10 further includes a compressor section 14 having a compressor inlet receiving ambient air from the environment E outside the engine 10 and a compressor outlet fluidly connected to an air inlet of the thermal engine module 11. The compressor 14 outputs compressed air from the compressor outlet to the thermal engine via a compressed air conduit 16 and a manifold 17. The compressed air conduit 16 and the manifold 17 may include any suitable arrangement of pipes configured to distribute compressed air between the different combustion chambers of the thermal engine 11. Any other suitable configurations used to supply compressed air to the thermal engine 11 are contemplated without departing from the scope of the present disclosure. The engine 10 further includes a turbine section/assembly 15 having an axially facing turbine inlet 15A fluidly connected to an engine outlet of the thermal engine module 11. The turbine section 15 has a turbine exhaust case 15B via which combustion gases are expelled to the environment E. The exhaust case 15B may include a tailpipe or any other suitable structures (e.g., exhaust mixer) for discharging the combustion gases from the engine 10.

Figure 2:
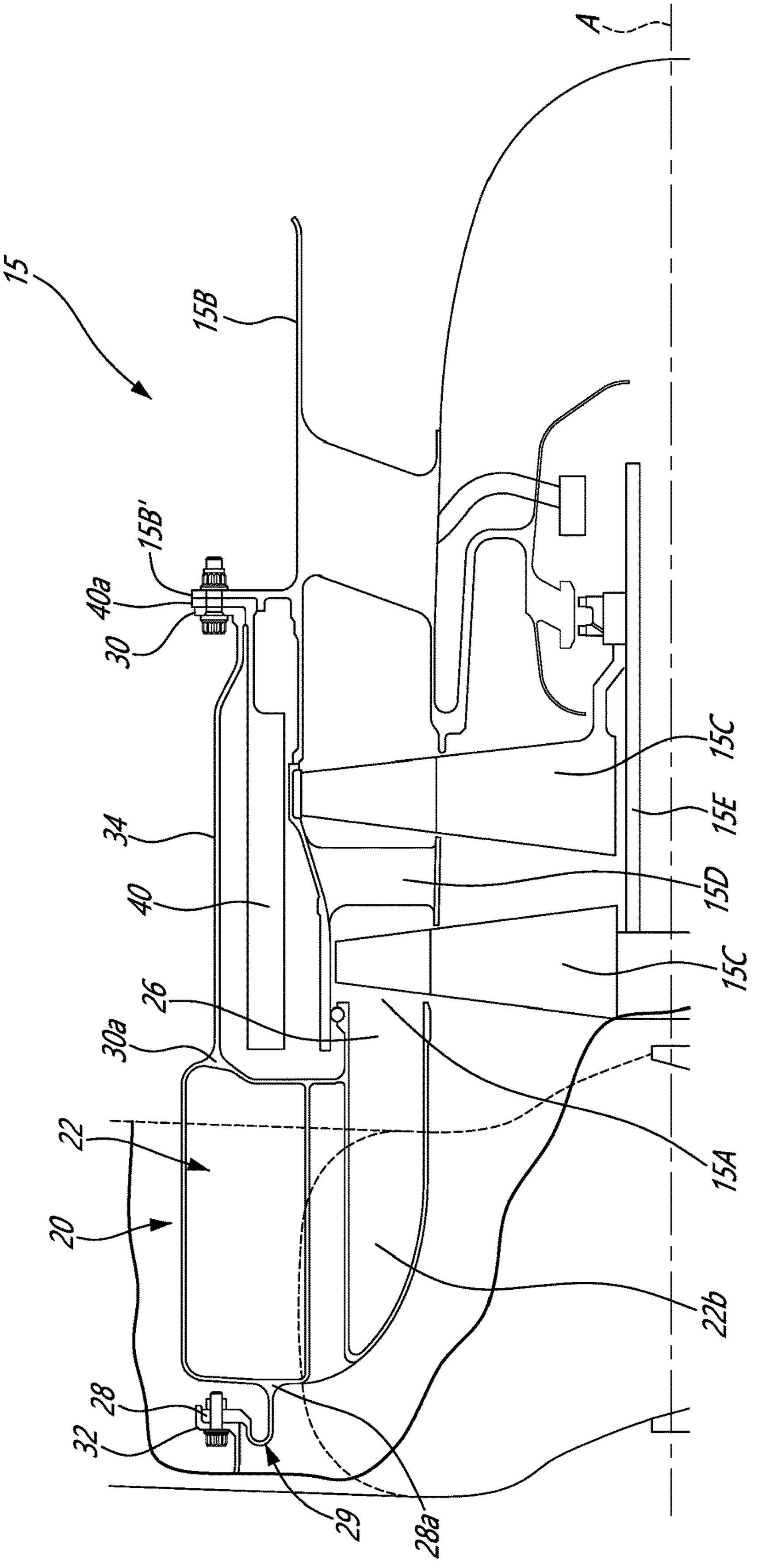
FIG. 2 is a side cross-sectional view of a portion of the aircraft engine of FIG. 1 illustrating a hot section of the engine and including a scroll case configured to make an external structure of the engine hot section using the scroll case to attach structural components, such as an internal containment ring, an exhaust casing and an engine tailpipe.

Referring to FIGS. 1-2, in one or more embodiment(s), the turbine section 15 includes an axial turbine having successive rows of rotor(s) 15C and stator(s) 15D disposed in alternation along a central axis A of the engine 10. The rotor(s) 15C may include rotor blades mounted to rotor discs. The stator(s) 15D may include stator vanes secured at opposite ends to inner and outer shrouds. In other words, the turbine section 15 may include a plurality of stages each including a stator and a rotor. The rotors 15C of the turbine section 15 are in driving engagement with a turbine shaft 15E. The turbine shaft 15E may be drivingly engaged to the output shaft 13, which may correspond to the engine shaft of the thermal engine module 11. Therefore, the turbine section 15 may compound power with the thermal engine module 11 to drive the rotatable load 12. In other words, the turbine shaft 15E may be drivingly engaged to the engine shaft of the thermal engine module 11 via suitable gearing. In the embodiment shown, the turbine shaft 15E is drivingly engaged to a compressor shaft of the compressor section 14. Thus, the turbine section 15 may drive both the rotatable load 12 and the compressor section 14. In the exemplified embodiment, the engine shaft of the thermal engine module 11, the output shaft 13, and the turbine shaft 15E are all coaxial about the central axis A. However, in other configurations, the turbine section 15 and/or the compressor section 14 may have respective shafts radially offset from one another relative to the central axis A.

As shown in FIG. 1, the engine outlet of the thermal engine 11 is fluidly connected to an exhaust manifold 18 that receives combustion gases outputted by the combustion chambers of the thermal engine module 11. The exhaust manifold 18 collects the combustion gases from the different combustion chambers and flows these combustion gases to a combustion engine exhaust pipe 19 that feeds the combustion gases to the turbine section 15. In other words, the engine outlet of the thermal engine module 11 is fluidly connected to the turbine inlet 15A via the exhaust manifold 18 and the combustion engine exhaust pipe 19. Any other suitable configurations used to supply combustion gases to the turbine section 15 are contemplated without departing from the scope of the present disclosure.

As schematically depicted by the flow arrows in FIG. 1, the combustion gases are flowing within the combustion engine exhaust pipe 19 and reach the turbine section 15 in a direction being mainly radial relative to the central axis A. However, the exemplified turbine section 15 includes an axial turbine and therefore the turbine inlet 15A receives the combustion gases along a direction being mainly axial relative to the central axis A. To redirect the combustion gases from a direction being mainly radial to a direction being mainly axial, the aircraft engine 10 further includes a scroll case 20 that regulates and reorients the combustion gases so that they meet an upstream most of the stages of the turbine section 15 at the most appropriate angle of attack. In the embodiment shown, the flow of combustion gases exiting the scroll case 20 meets a first stage rotor 15C of the turbine section 15 before meeting a stator thereof. The scroll case 20 may therefore be used to adequately orient the combustion gases at the most appropriate angle to meet the upstream-most airfoils of the turbine section 15, which are herein part of one of the first stage rotors 15C.

Figure 3B:
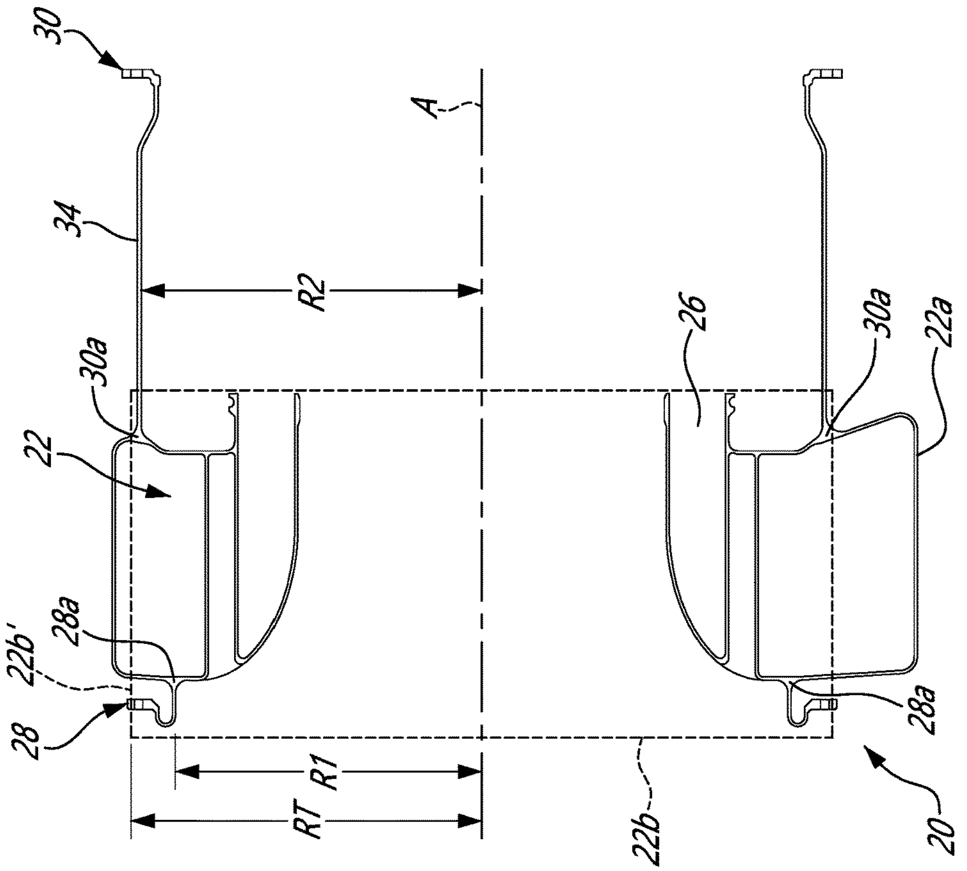
FIG. 3*b* is a side cross-sectional view of the scroll case.

As will be seen hereinafter, in addition to its aerodynamic role, the scroll case 20 is configured for use as a structural case, thereby eliminating the need for a dedicated external structural case for supporting the rear parts of the engine hot section. As shown in the exemplified embodiment, the scroll case 20 may be provided in form of a unitary body or mono-case comprising a conduit 22 extending around the central axis A from an inlet 24 (FIG. 3*a*) to an outlet 26 (FIG. 3*b*). Vanes (not shown) could be provided in the conduit 22 to direct and regulate the flow of combustion gases. The inlet 24 is fluidly connected to the combustion engine exhaust pipe 19, whereas the outlet 26 is fluidly connected to the inlet 15A of the turbine section 15. According to the illustrated embodiment, the scroll inlet 24 has a tangential component and the scroll outlet 26 is an annular outlet facing axially in a rearward direction and in alignment with the turbine gas path.

Figure 3A:
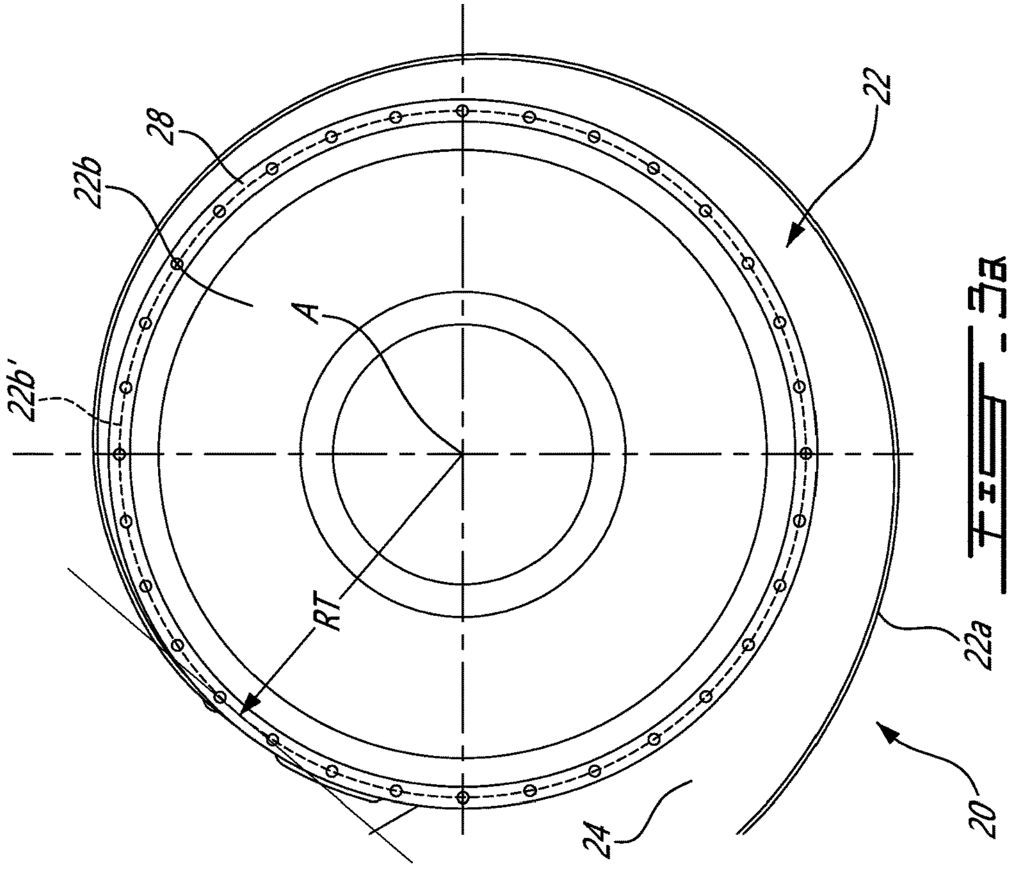
FIG. 3*a* is a front cross-sectional view of the scroll case.

As shown in FIG. 3*a*, the conduit 22 comprises a non-axisymmetric portion 22*a* extending downstream from the inlet 24 and spiraling towards the central axis A. As it progresses circumferentially around the central axis A, the non-axisymmetric portion 22*a* of the conduit 22 transitions or merges with an axisymmetric portion 22*b* which form a 360 degrees symmetric structure around the central axis A. The axisymmetric portion 22*b* extends downstream from the non-axisymmetric portion 22*a* to the outlet 26. As can be appreciated from FIGS. 3*a* and 3*b*, the axisymmetric portion 22*b* has an outer cylindrical boundary 22*b*' radially spaced from the central axis A by a radius RT. As shown in FIG. 3*a*, the radius RT corresponds to a radial distance between the central axis A and a point of tangency between the non-axisymmetric portion 22*a* of the conduit 22 and the axisymmetric portion 22*b* thereof.

The inventors have found that in engine running conditions, the thermal distortions are non-uniform in the non-axisymmetric portion 22*a* of the scroll case 20. However, the thermally induced distortions are minimal in the 360 degrees axisymmetric portion 22*b*. That is the axisymmetric portion 22*b* remains substantially aligned with the central axis A of the engine in running conditions. The structural stability of the axisymmetric portion 22*b* of the scroll case 20 make it suitable for structurally supporting engine components while maintaining engine concentricity/alignment with the engine central axis A. As will be seen hereafter, the scroll case 20 can be configured such that it defines a load path through the axisymmetric portion 22*b* and not through the non-axisymmetric portion 22*a* thereof. That is the scroll case 20 can be configured so that the non-axisymmetric portion 22*a* is disposed outside of the load path. In other words, the scroll case 20 can be configured so that the non-axisymmetric portion 22*a* is only used to carry an aerodynamic function, whereas the axisymmetric portion 22*b* is used to perform both an aerodynamic and a structural function.

Structural loads can be transferred from aft of the scroll case 20 to forward of it via a front flange 28 and a rear flange 30 connected to the axisymmetrical portion 22*b* of the scroll case 20. As shown in FIG. 3*b*, the front flange 28 is connected to an axially facing front wall of the scroll case conduit 22 at a first radial location 28*a* contained within the axisymmetric portion 22*b* radially inwardly of the non-axisymmetric portion 22*a*. According to the illustrated embodiment, the first radial location 28*a* is defined by a circle having a radius R1 about the central axis A. The radius R1 as measured from the central axis A is equal to or smaller than the radius RT of the axisymmetric portion 22*b*. As can be appreciated from FIG. 2, the front flange 28 can be bolted or otherwise suitably rigidly joined to a mating flange 32 of an axially adjacent engine structure, such as a bearing case disposed axially forwardly of the scroll case 20. As shown in FIG. 2, the front flange 28 may have a hairpin connection 29 to the front wall of the axisymmetric portion 22*b* of the scroll case 20. The hairpin connection 29 provides added flexibility to allow an asymmetrical thermal distribution mitigating stress concentrations at the flange connection with the scroll case.

Referring back to FIG. 3*b*, the rear flange 30 is connected to an axially facing rear wall of the conduit 22 of the scroll case 20 at a second radial location 30*a* contained within the axisymmetric portion 22*b* radially inwardly of the non-axisymmetric portion 22*a*. According to the illustrated embodiment, the second radial location 30*a* is defined by a circle having a radius R2 about the central axis A. The radius R2 as measured from the central axis A is equal to or smaller than the radius RT of the axisymmetric portion 22*b*. As can be appreciated from FIG. 3*b*, in some embodiments, the radius R2 can be greater than the radius R1.

According to one or more embodiments, the rear flange 30 can be provided on a cylinder 34 extending integrally from the rear wall of the conduit 22 of the scroll case 20. That is the rear flange 30 is connected to the axisymmetric portion 22*b* of the conduit 22 via the cylinder 34. As shown in FIG. 3*b*, the cylinder 34 is axially aligned with the central axis A and has a radius corresponding to radius R2. According to the illustrated embodiment, the rear flange 30 extends radially outwardly from a distal end of the cylinder 34.

As shown in FIG. 2, the turbine exhaust case 15B can have a flange 15B' rigidly attached to the rear flange 30 of the scroll case 20, such as by bolting or the like. In this way, the exhaust case 15B can be supported by the scroll case 20 and structural loads from the exhaust case 15B can be transferred forward of the scroll case 20 via the rear flange 30, the rear cylinder 34, the axisymmetrical portion 22B of the scroll case conduit 22 and the front flange 28. This eliminates the need for a dedicated structural case outside the scroll case 20 to structurally support the exhaust parts of the engine. In addition to lowering the part counts and the engine weight, the use of the scroll case 20 as a structural component allows to reduce the radial envelope of the engine. Still referring to FIG. 2, it can be seen that the scroll case 20 can also be used to support an inner containment ring 40 around the rotor(s) 15C of the turbine section 15. The containment ring 40 may be disposed in an annular space radially between the cylinder 34 and the tips of the turbine blades. According to the illustrated embodiment, the containment ring 40 has a flange 40*a* extending radially outwardly from a rear end thereof. The flange 40*a* of the containment ring 40 can be clamped in sandwich between the rear flange 30 of the scroll case 20 and the associated flange 15B' of the turbine exhaust case 15B.

According to one or more embodiments, the scroll case 20 is manufactured as a mono-case having a one-piece body including the front flange 28, the hairpin connection 29, the conduit 22 with its axisymmetric and non-axisymmetric portions 22*a*, 22*b*, the cylinder 34 and the rear flange 30. Such a mono-case structure can be obtained from additive manufacturing, casting, weld assembly or any other suitable manufacturing processes. The scroll case 20 can be made of any suitable high strength, thermal resistant materials, such as nickel-chromium-based superalloys.

According to one ore more embodiments, the scroll case is configured as a structural component to carry structural loads from other engine components, such as an internal containment ring, an exhaust casing and an engine tailpipe.

According to one aspect of the one or more embodiments, the scroll case has a front flange positioned radially at the point of tangency between an axisymmetrical part of the scroll and a non-axisymmetrical part thereof.

According to another general aspect of the one or more embodiments, the scroll case has a back flange, which is attached to a cylinder forming an external cylindrical part of the engine. The cylindrical part is an integrated part of the scroll where the connection is also positioned radially at the tangency point between the axisymmetrical part of the scroll and the non-axisymmetrical part of the scroll.

At least some of the above embodiments eliminate the need for a structure above the scroll to support the hot section of the engine. This results in weight savings and it allows for a compact engine core design.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, it is understood that in some embodiments, the rear flange 30 could be directly connected to the rear wall of the conduit 22 or at other locations along the length of the cylinder 34. The scroll case inlet could be connected to other sources of combustion gases. For instance, it could receive combustion gases from a gas turbine engine combustor. Yet further modifications could be implemented by a person of ordinary skill in the art in view of the present disclosure, which modifications would be within the scope of the present technology.

The invention claimed is:

1. An aircraft engine comprising:

a turbine including a rotor rotatable about a central axis;

a scroll case including:

an inlet fluidly connected to a source of combustion gases and an outlet fluidly connected to the turbine;

a conduit extending around the central axis from the inlet to the outlet, the conduit disposed axially forwardly of the rotor of the turbine, the conduit having a non-axisymmetric portion extending downstream from the inlet and spiraling towards the central axis, and an axisymmetric portion extending downstream from the non-axisymmetric portion to the outlet;

a front flange structurally connected to a front wall of the conduit at a first radial location on the axisymmetric portion of the conduit, the first radial location being radially inward of the non-axisymmetric portion;

a cylinder projecting axially from a rear wall of the conduit, the cylinder surrounding and axially overlapping the rotor of the turbine;

a containment ring disposed in a radial gap between the cylinder and the rotor of the turbine, the containment ring circumscribing the rotor;

a rear flange structurally connected to the rear wall of the conduit via the cylinder, the rear flange disposed at a second radial location on the axisymmetric portion of the conduit, the second radial location being radially inward of the non-axisymmetric portion; and an exhaust case disposed downstream of the turbine and of the scroll case, the exhaust case structurally supported by the scroll case, the exhaust case attached to the rear flange of the scroll case.

2. The aircraft engine as defined in claim 1, wherein the non-axisymmetric portion and the axisymmetric portion of the conduit of the scroll case meet at a point tangent to a circle around the central axis, the circle having a radius RT, wherein the first radial location has a radius R1, and wherein R1≤RT.

3. The aircraft engine as defined in claim 1, wherein the non-axisymmetric portion and the axisymmetric portion of the conduit of the scroll case meet at a point tangent to a circle around the central axis, the circle having a radius RT, wherein the second radial location has a radius R2, and wherein R2≤RT.

4. The aircraft engine as defined in claim 1, wherein the non-axisymmetric portion and the axisymmetric portion of the conduit of the scroll case meet at a point of tangent to a circle centered relative to the central axis, the circle having a radius RT, the first radial location having a radius R1, the second radial location having a radius R2, R1 and R2 being equal to or smaller than RT.

5. The aircraft engine as defined in claim 4, wherein R1≤R2.

6. The aircraft engine as defined in claim 1, wherein the front flange is connected to the front wall of the conduit via a hairpin connection.

7. The aircraft engine as defined in claim 1, wherein the turbine is an axial turbine having an axial inlet, and wherein the outlet of the scroll case is annular and axially face the axial inlet of the turbine.

8. The aircraft engine as defined in claim 1, wherein the rear flange is provided at a distal end of the cylinder projecting integrally axially from the rear wall of the conduit of the scroll case.

9. The aircraft engine as defined in claim 8, wherein the containment ring is attached to the rear flange.

10. The aircraft engine as defined in claim 9, wherein the exhaust case includes an engine tailpipe, the scroll case supporting the engine tailpipe.

11. The aircraft engine as defined in claim 8, wherein the exhaust case projects axially aft of the cylinder of the scroll case.

12. A turbine assembly comprising:
- a turbine having a turbine rotor rotatable about a central axis;
- a scroll case for channeling a flow of combustion gases to the turbine, the scroll case axially spaced from the turbine; the scroll case including:
  - a conduit winding about the central axis between an inlet and an outlet, the conduit having a non-axisymmetric portion extending from the inlet and an axisymmetric portion extending downstream from the non-axisymmetric portion to the outlet, the axisymmetric portion having an outer cylindrical boundary radially spaced from the central axis by a radius RT;
  - a front flange structurally connected to a front wall of the conduit at a first radial distance R1 from the central axis;
  - a cylinder extending from a rear wall of the conduit, the cylinder surrounding the turbine rotor;
  - a rear flange at a rear end of the cylinder, the rear flange structurally connected to the rear wall of the conduit via the cylinder at a second radial distance R2 from the central axis; and
  - wherein R1 and R2≤RT; and
- a containment ring disposed in a radial gap between the cylinder and the turbine rotor.

13. The turbine assembly as defined in claim 12, wherein the radius RT corresponds to a distance between the central axis and a point of tangency between the axisymmetric portion and the non-axisymmetric portion of the conduit of the scroll case.

14. The turbine assembly as defined in claim 13, wherein the cylinder extends integrally axially from the rear wall of the axisymmetric portion of the scroll case, the rear flange carried by the cylinder axially aft of the turbine rotor.

15. The turbine assembly as defined in claim 14, wherein the containment ring is attached to the rear flange of the scroll case.

16. The turbine assembly as defined in claim 12, further comprising an exhaust case downstream of a last stage of the turbine, the exhaust case structurally supported by the scroll case.

17. The turbine assembly as defined in claim 16, wherein the front flange is connected to the front wall of the scroll case via a hairpin connection.

18. A scroll case for interconnecting a thermal engine to an axial turbine, comprising: a structural mono-case body including:
- a conduit extending circumferentially about a central axis between an inlet and an outlet, the outlet extending circumferentially about the central axis and oriented axially relative to the central axis, the conduit having a non-axisymmetric portion spiraling from the inlet toward the central axis, an axisymmetric portion extending around the central axis from the non-axisymmetric portion to the outlet;
- a front flange connected to a front wall of the axisymmetric portion of the conduit via a hairpin connection at a location radially inward of the non-axisymmetric portion;
- a cylinder projecting axially from a rear wall of the conduit, the cylinder disposed radially inward of the non-axisymmetric portion of the conduit and axially rearwardly from the outlet of the conduit, the cylinder configured to circumscribe the axial turbine;
- a rear flange extending radially outwardly from the cylinder; and
- a containment ring attached to the rear flange, the containment ring disposed inside the cylinder and configured to surround a rotor of the axial turbine.

19. The scroll case as defined in claim 18, wherein the rear flange is provided at a distal end of the cylinder opposite to a proximal end of the cylinder that is connected to the rear wall of the conduit.

20. The scroll case as defined in claim 18, wherein the rear flange is disposed radially outward of the front flange.

* * * * *